(12) United States Patent
Abrahamsson et al.

(10) Patent No.: US 11,162,385 B2
(45) Date of Patent: Nov. 2, 2021

(54) TURBINE EXHAUST CASE COOLING

(71) Applicant: GKN Aerospace Sweden AB, Trollhättan (SE)

(72) Inventors: Hans Abrahamsson, Trollhättan (SE); Carlos Arroyo, Trollhättan (SE); Anders Bergman, Trollhättan (SE); Andreas Fahlvik, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 0 days.

(21) Appl. No.: 16/647,051

(22) PCT Filed: Sep. 14, 2018

(86) PCT No.: PCT/EP2018/074970
§ 371 (c)(1),
(2) Date: Mar. 13, 2020

(87) PCT Pub. No.: WO2019/053229
PCT Pub. Date: Mar. 21, 2019

(65) Prior Publication Data
US 2020/0263562 A1    Aug. 20, 2020

(30) Foreign Application Priority Data

Sep. 15, 2017 (GB) ..................... 1714886

(51) Int. Cl.
*F01D 25/12* (2006.01)
*F01D 9/06* (2006.01)
(Continued)

(52) U.S. Cl.
CPC ............. *F01D 25/12* (2013.01); *F01D 9/065* (2013.01); *F01D 25/14* (2013.01); *F01D 25/162* (2013.01);
(Continued)

(58) Field of Classification Search
CPC . F01D 5/18; F01D 9/065; F01D 25/12; F01D 25/14; F01D 25/26; F01D 25/30;
(Continued)

(56) References Cited

U.S. PATENT DOCUMENTS 8,756,911 B1 * 6/2014 Liang ..................... F01D 25/30
60/269
2003/0150205 A1  8/2003 Baxter et al.
(Continued)

FOREIGN PATENT DOCUMENTS

EP    1574668 A2    9/2005
EP    3196422 A1    7/2017
(Continued)

OTHER PUBLICATIONS

International Search Report and Written Opinion for PCT/EP2018/074970 dated Mar. 29, 2019 (7 pages).
(Continued)

*Primary Examiner* — Igor Kershteyn
(74) *Attorney, Agent, or Firm* — Bejin Bieneman PLC

(57) ABSTRACT

A turbine exhaust casing (TEC) cooling arrangement for a gas turbine engine includes cooling the struts of a TEC using
(Continued)

compressed air communicated from one of the engine's compressors.

17 Claims, 4 Drawing Sheets

(51) Int. Cl.
    *F01D 25/14*         (2006.01)
    *F02C 7/18*          (2006.01)
    *F01D 25/16*         (2006.01)
    *F01D 25/30*         (2006.01)

(52) U.S. Cl.
    CPC ............... *F01D 25/30* (2013.01); *F02C 7/18* (2013.01); *F05D 2220/36* (2013.01); *F05D 2240/12* (2013.01); *F05D 2240/35* (2013.01); *F05D 2260/201* (2013.01)

(58) Field of Classification Search
    CPC ........ F01D 25/125; F01D 25/162; F02C 7/18; F05D 2220/36; F05D 2240/12; F05D 2240/135; F05D 2260/201
    See application file for complete search history.

(56) References Cited

U.S. PATENT DOCUMENTS

| | | | |
|---|---|---|---|
| 2011/0081237 A1* | 4/2011 | Durocher | F01D 25/12 |
| | | | 415/173.1 |
| 2013/0084172 A1* | 4/2013 | Kasibhotla | F01D 25/30 |
| | | | 415/182.1 |
| 2014/0205447 A1 | 7/2014 | Patat et al. | |
| 2014/0352313 A1 | 12/2014 | Schott et al. | |
| 2015/0285095 A1* | 10/2015 | Yeager | F01D 25/162 |
| | | | 415/1 |
| 2015/0330249 A1* | 11/2015 | Budnick | F02C 7/20 |
| | | | 415/116 |
| 2015/0345400 A1* | 12/2015 | Scott | F01D 25/162 |
| | | | 60/796 |
| 2017/0211424 A1* | 7/2017 | Takeda | F01D 9/065 |
| 2017/0241295 A1* | 8/2017 | Konishi | F01D 25/14 |

FOREIGN PATENT DOCUMENTS

| | | |
|---|---|---|
| WO | 2014105522 A1 | 7/2014 |
| WO | 2014105781 A1 | 7/2014 |

OTHER PUBLICATIONS

UKIPO Search Report for GB1714886.7 dated Feb. 1, 2018 (8 pages).

* cited by examiner

TURBINE EXHAUST CASE COOLING

CROSS-REFERENCE TO RELATED APPLICATIONS

This application is a national stage of, and claims priority to, Patent Cooperation Treaty Application No. PCT/EP2018/074970, filed on Sep. 14, 2018, which application claims priority to Great Britain Application No. GB 1714886.7, filed on Sep. 15, 2017, which applications are hereby incorporated herein by reference in their entireties.

BACKGROUND

A typical turbofan engine comprises a pair of compressors, namely a first upstream low pressure compressor and a second, downstream, high pressure compressor. The pair of compressors compress air entering the air intake of the engine in two-stages before the compressed gas is communicated into the combustors where fuel is introduced and combusted with the compressed air. Exhaust gas leaving the combustors impinges first on a high pressure turbine (which rotates the compressors) and the secondly on a low pressure turbine (which rotates the fan of a turbofan engine). Exhaust gas then leave the rear of the engine.

The exhaust gas exiting the low pressure turbine leaves the aft of the turbine through a turbine exhaust casing (TEC). The operation of a gas turbine engine is well known to a person skilled in the art who will also be familiar with the arrangement of a conventional TEC which comprises an inner circumferential casing portion and an outer circumferential casing portion. A plurality of radially extending struts extending between the inner and outer casing portion of the TEC and provide structural support between the two portions.

The radial space between the inner and out casing portions provides the exhaust channel for exhaust gases. Exhaust gas passes through the channel and around the radially extending struts. The struts are provided with an aerodynamic profile so as not to inhibit the flow of exhaust gas from the turbine.

Exhaust gases are released at extremely high temperatures, for example in excess of 650 degree C. (1200 F.), and this high temperature necessitates careful material selection. The exhaust gas temperature depends on the operating characteristics of the engine together with the conditions in which engine operates. A particular problem scenario is lengthy taxi times to runways at ever increasingly busy airports where TEC temperatures can begin to rise 750-800 C. (1400-1500 F.) This can be further compounded in situations where high ambient conditions arise at an airport and where engines are designed with high bypass ratios i.e. the ratio between the engine core diameter and the fan diameter.

Engine manufacturers therefore have to design engines to accommodate such scenarios for safe operation.

To address these design requirements, manufacturers select materials such as Inconel 718 or Haynes 282 to manufacture the TEC so as to accommodate very high operating temperatures. Such materials are expensive and difficult to machine increasing the cost and complexity of manufacturing the engine. Maintenance costs are also increased.

SUMMARY

The present disclosure is concerned with a novel cooling system for gas turbine engines. Specifically, but not exclusively, the disclosure is concerned with a cooling arrangement for a turbine exhaust case (TEC) for a turbo fan engine. It will be recognised that the concept may be applied to other engine types using a TEC. The present design reduces manufacturing costs, material costs and maintenance costs.

Viewed from first aspect there is provided a turbine exhaust casing (TEC) cooling arrangement for a gas turbine engine, said engine comprising at least one compressor, said turbine exhaust casing comprising an inner casing portion and an outer casing portion and a plurality of radially extending hollow struts connecting the inner and outer portions, said arrangement further comprising an air duct arranged to communicate compressed air from said at least one compressor into at least one of said hollow struts. Thus, the struts of a turbine exhaust casing can be cooled utilising compressed air received from the compressor of the engine.

This in turn (a) increases the operational temperature range of a given engine owing to the cooling effect of the arrangement and/or (b) allows materials to be used in the design and construction of the TEC which could not normally be used because of the anticipated operating temperatures.

Specifically, lower grade materials can be safely used for engine designs which are prone to high turbine exhaust temperatures.

The compressed air may be communicated to each of the struts in a variety of paths through the engine. Advantageously the air duct from the compressor may be in fluid communication with a manifold wherein the manifold further comprises a plurality of radially extending channels, each channel extending within and radially along at least part of the radial length of each strut. Thus, a single duct is needed to pass through the engine from the compressor to feed a common manifold or supply rail which in turn communicates compressed air to the numerous channels located within or proximate to each strut.

The manifold may be any suitable shape but to minimise size and weight the manifold may be a circular manifold concentric with a rotational axis of the at least one compressor and located proximate to the inner casing portion. Each of the channels within the struts may then advantageously extend radially outwards from the manifold. Locating the manifold proximate to the inner portion of the TEC means it has a small diameter, smaller circumference and thus has a lower weight. This reduces the additional weight that the cooling arrangement adds to the engine design.

Air may be communicated to the manifold in a variety of paths through the engine. However, the air duct may be in fluid communication with the circular manifold through one of the radially extending struts. The struts are hollow and thus provide a convenient path through which an air supply duct/conduit may pass to connect to the manifold.

The channels within each strut may have a variety of different cross-sections. However, the channel may advantageously be in the form of simple tubes extending from the manifold all or part way along each strut. This minimises the complexity of the arrangement.

Each of the channels/tubes is provided with a plurality of holes allowing compressed air inside the channel to pass out of the channel and into the hollow strut in which the channel is located.

The leading and trailing edges of the strut are raised to the highest temperature in operation of the engine and so the holes are arranged to eject compressed air from the channel towards the inner surface of the strut corresponding to leading edge of the strut. Similarly, holes are further provided to eject compressed air from the channel towards the inner surface of the strut corresponding to the trailing edge of the strut. Thus, the strut can be cooled effectively on the leading and trailing edges.

The holes may be arranged in any suitable formation for a given engine design and expected heat distribution across the strut. In one arrangement where the leading edge is hotter than the trailing edge the holes may be arranged in two rows on the leading edge of the strut and a single row on the trailing edge of the strut. The holes may also be arranged to direct a greater proportion of air to the leading edge at the suction side of the profile thus enhancing cooling further.

The position of each tube within a respective strut may be determined based on the desired cooling characteristics. Advantageously, the channel or tube may be located centrally (measured along the axis of the engine) within the strut to effect cooling of both the leading and trailing edges uniformly. This also simplifies the design.

The air released into each strut may be released to atmosphere my means of apertures in the strut for example, advantageously a flow path may be provided at the root of each strut allowing cooling air to escape from each strut and pass radially inwards from the strut. The path may allow the cooling air to pass into the tail cone before being released to atmosphere.

The holes may advantageously be arranged to eject compressed air in a speed range between Mach 0.8 to 1.0. Furthermore, the holes may be arranged to eject compressed air towards the leading edge (LE) inside position where the hot air strikes the LE on the outside of the vane. It will be recognised that achieving the desired ejection speed is by means of selecting a combination of compressor pressure air (i.e. where the air is sourced from in the engine) together with a determination of pressure losses in the conduits conveying the air to the manifold and the hole sizes.

Viewed from another aspect there is provided a turbo-fan engine comprising a turbine exhaust casing (TEC) cooling arrangement as described herein.

Viewed from yet another aspect there is provided a gas turbine engine comprising at least one compressor and a turbine exhaust casing, the engine comprising a flow path between the at least one compressor and the exhaust turbine casing to provide a flow of compressed air to said turbine exhaust casing.

Viewed from a still further aspect there is provided a method of cooling a turbine exhaust casing for a gas turbine engine, said engine comprising at least one compressor, said turbine exhaust casing comprising an inner casing portion and an outer casing portion and a plurality of radially extending hollow struts connecting the inner and outer portions, said method comprising selectively communicating compressed air from said at least one compressor into at least one of said hollow struts.

The cooling arrangement may be operated automatically, for example in response to a temperature indication or measurement of the turbine exhaust casing (an upper temperature threshold).

Control of the cooling may be achieve by means of a controllable valve which can adjust the amount of air being released into the cooling arrangement. For example a feedback control system may be used in which the temperature of the TEC is continuously monitored and controlled to be within acceptable operational temperature ranges by activating and deactivating (and moderating) the cooling air flow.

Ambient temperature conditions may also feed into the control system.

Viewed from a still further aspect there is provided a turbofan gas turbine engine comprising a forward section containing a fan arrangement, a mid-section containing at least one compressor, and a rear section containing a combustion chamber, at least one exhaust turbine and a turbine exhaust casing, said turbine exhaust casing further comprising an inner casing portion and an outer casing portion and a plurality of radially extending struts connecting the inner and outer portions, wherein each strut further comprises an internal radially extending channel along at least part of its radial length, wherein the channel is in fluid communication with one of said compressors and arranged to receive compressed air from said compressor and to release said compressed air into an internal space within the strut.

DRAWINGS

Example aspects will now be described with reference to the accompanying figures in which.

Figure 1:
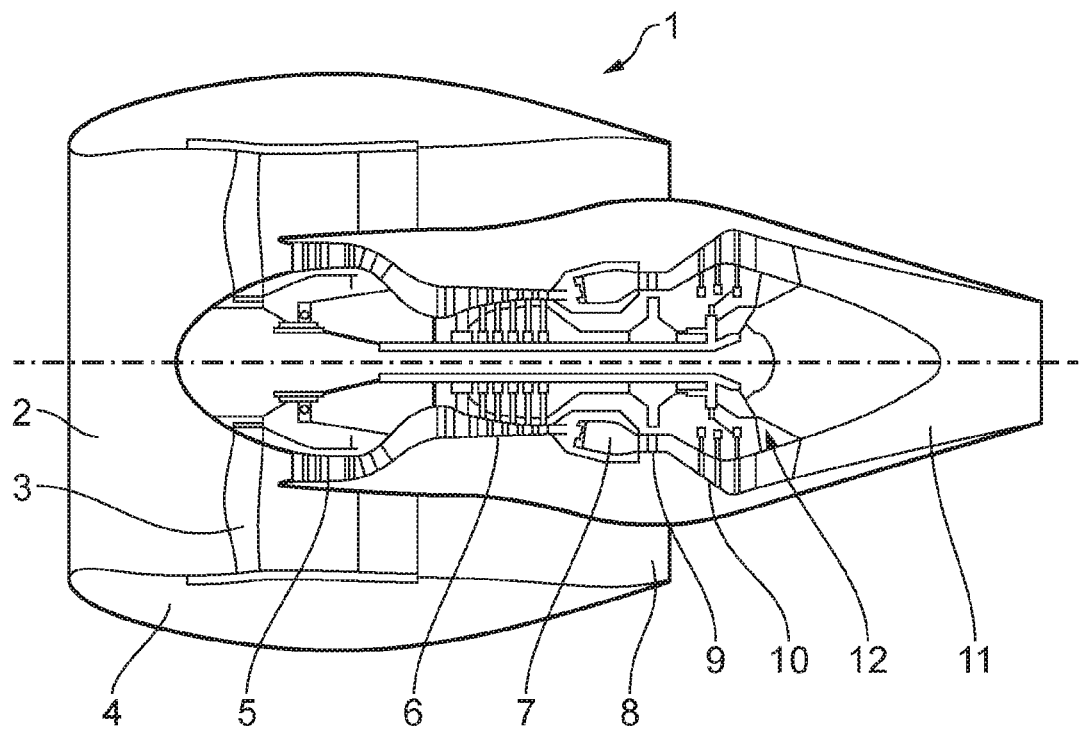
FIG. 1 shows a schematic cross-section of a geared turbo fan engine.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention It will be recognised that the features of the aspects of the invention(s) described herein can conveniently and interchangeably be used in any suitable combination. It will also be recognised that the invention covers not only individual embodiments but also combinations of the embodiments described.

DETAILED DESCRIPTION

FIG. 1 shows a cross-section of a gas turbine engine 1 incorporating a turbine exhaust casing (TEC) cooling arrangement as described in detail below.

The skilled person will understand the principal components of a gas turbine engine and their operation. In summary, the engine 1 comprises an air intake 2 which permits air to flow into the engine to the fan 3 located at the upstream end of the engine. All of the components are housed within the engine nacelle 4.

The engine comprises a bypass channel downstream of the fan and a central engine core which contains the thrust generating combustors. The core of the engine is formed of a first low pressure compressor 5 and a second high pressure compressor 6. This multi-stage compressor arrangement takes air from ambient pressure and temperature to high temperature and pressure. Compressed air is then communicated to the combustion chamber 7 where fuel is injected and combustion occurs.

The combustion gases are expelled from the rear of the combustions chamber 7 and impinge first on a high pressure turbine 9 and then on a second low pressure turbine 10 before leaving the rear of the engine through the core nozzle 11. Thrust from the engine is created by two gas flows: a first from the fan nozzle 8 (receiving thrust from the fan) and secondly from the exhaust gases from the core nozzle 11.

A turbine exhaust casing (TEC) 12 located at the aft of the engine 1.

Figure 2:
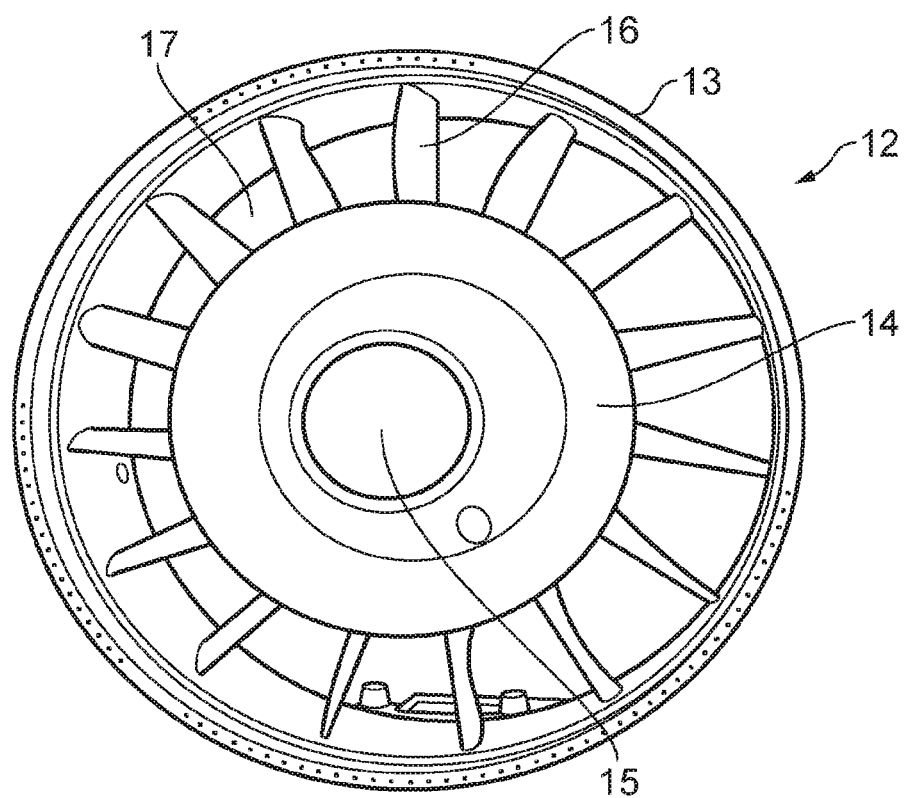
FIG. 2 shows a turbine exhaust casing.

FIG. 2 shows the turbine exhaust casing in isolation. The TEC comprises an outer circumferential casing portion 13 and an inner circumferential casing portion 14. The inner and outer portions are arranged to be concentric with the rotational axis of the engine shown in FIG. 1. The central hub 15 provides support for the bearings which carrying the rotating shafts which extend along the axis of the engine. Struts 16 are arranged between the inner and outer portions and are equally spaced around the TEC and extend radially from the inner to the outer portions. The space 17 between the inner and outer portions defines the exhaust path through which exhaust gases from the turbines can pass to exit the engine. As shown the struts further comprise an aerodynamic profile to direct the exhaust gas in a rearward direction to maximise thrust along the axis of the engine.

It will be recognised that the exhaust gas leaving the turbines is extremely hot, for example in excess of 650 degrees C. The hot exhaust gas passes through the annular passage 17 and in doing so impinges on the struts 16 and heats the struts.

During long taxi journeys to a take-off runway and/or on days with high ambient temperatures the strut temperatures can become extremely high and could cause material degradation. This is conventionally mitigated by material selection to accommodate these high operating temperatures.

However, each of the struts can be provided with a cooling arrangement as now described.

Figure 3:
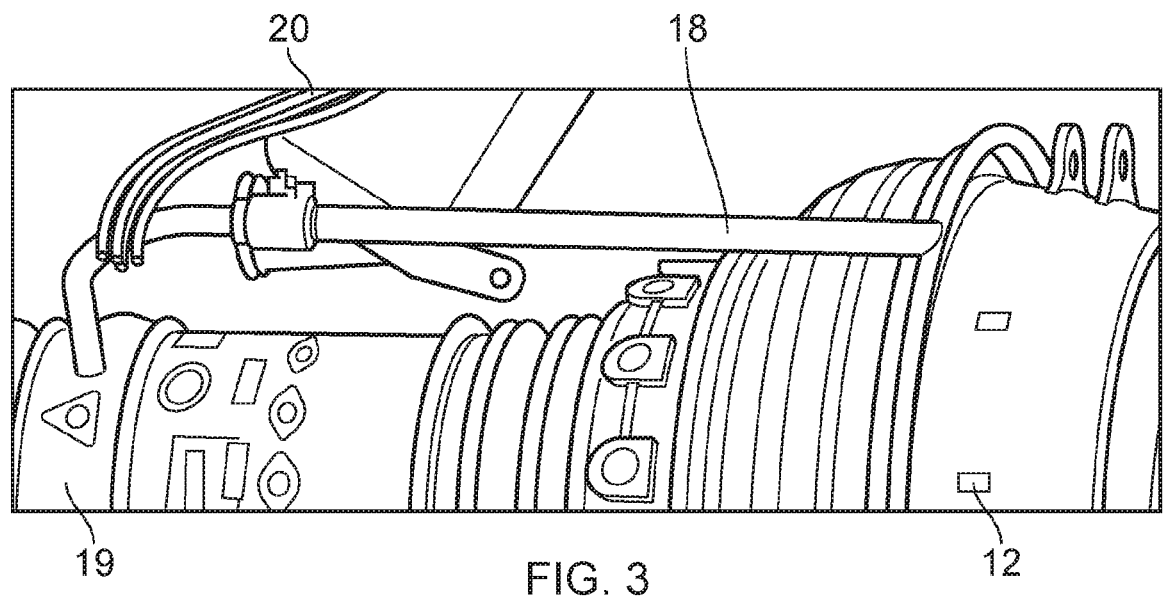
FIG. 3 shows an air duct connecting the compressor and the TEC.

FIG. 3 shows a view of the core of the engine shown in FIG. 1 and shows a compressed air supply duct 18. The duct 18 is arranged to provide a passage for compressed air from a predetermined stage of the compressor 19 to the turbine exhaust casing 12. The duct is a simple tube which allows compressed gas to flow. The duct 18 may advantageously be provided with a control valve 20 which allows the flow to be selectively opened and closed. Thus, the cooling arrangement can be selectively operated in response to the temperature of the casing 12 and/or operation by the pilot.

Figure 4:
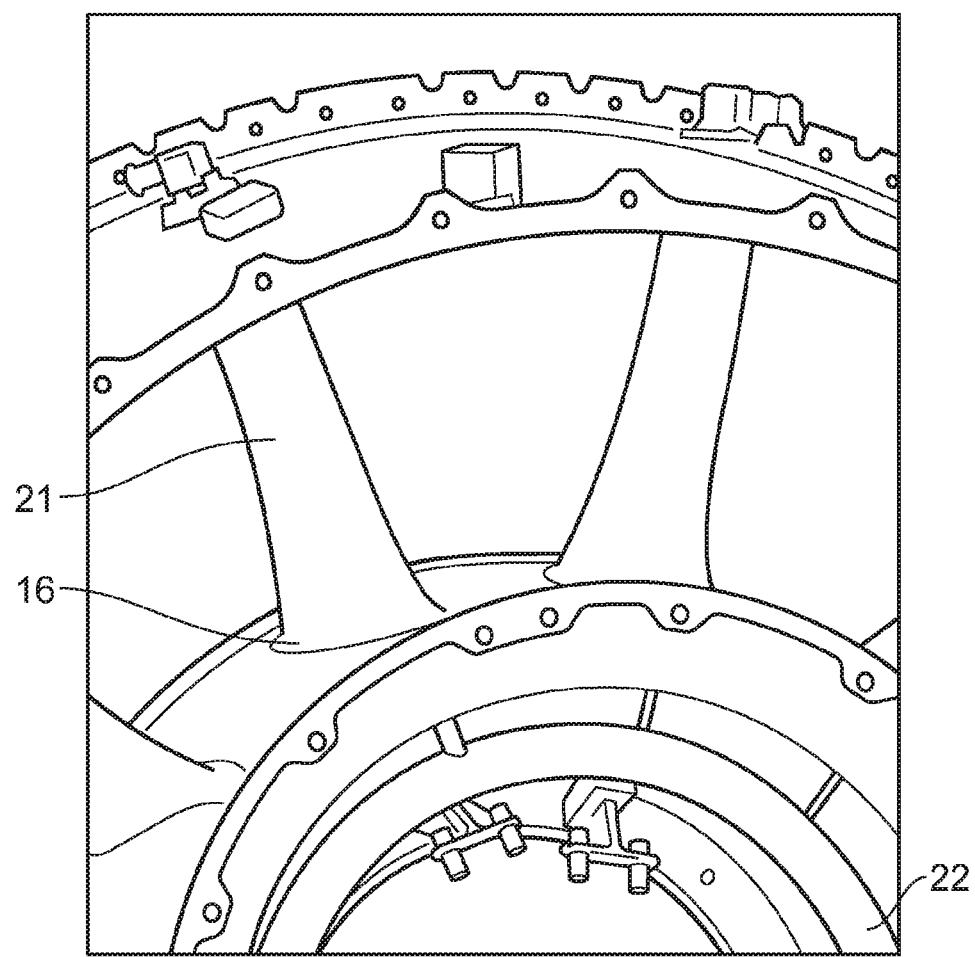
FIG. 4 shows a strut and central manifold.

FIG. 4 shows a closer view of the TEC with a superimposed view of the cooling arrangement arranged within the TEC.

As shown in FIG. 4 the strut 16 comprises an internal channel (also referred to as a tube or spray bar) 21 located within the strut. To reduce weight each of the struts is hollow which provides a space into which the cooling channel 21 can be located. FIG. 4 also shows a centrally located air flow manifold 22. Each of the cooling channels 21 as in fluid communication with the manifold 22 as described below.

The manifold may be proximate to the outer casing portion 13 with the air channels extending inwards. However, placing the manifold proximate to the inner casing portion 14 reduces its circumference and thus reduces its weight. Thus, as shown in FIG. 4, the manifold is centrally located proximate to the inner portion 14 of the TEC.

Figure 5:
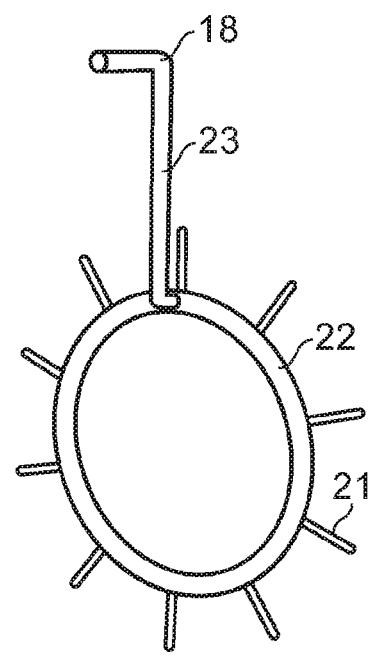
FIG. 5 shows the central manifold and radially extending tubes or spray bars.

FIG. 5 shows the manifold and radially extending air channels or tubes in isolation.

As shown in FIG. 5, the cooling arrangement comprises a central manifold 22 and a plurality of radially extending channels 21 in fluid communication with the manifold. The position of each of the channels corresponds to the angular position of each of the struts. Thus, each strut received a channel 21.

Compressed air is supplied to the manifold from the compressor (via duct 18) through the supply conduit 23. The supply conduit 23 connects the air duct 18 to the manifold 22 and is arranged to pass through one of the hollow struts alongside the air supplying channel 21 within that same strut. Thus, in operation, compressed air can be supplied to the manifold and in turn to each of the radially extending channels 21 within the hollow struts.

Figure 6:
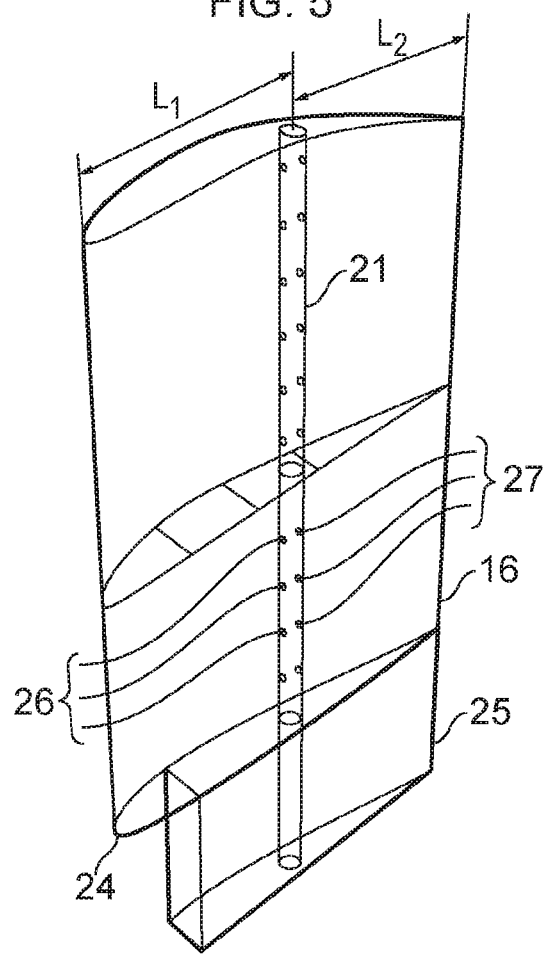
FIG. 6 shows a strut and spray bar.

FIG. 6 shows a single strut 16 and the channel 21 located within the hollow space within the strut.

The strut 16 comprises a leading edge 24 and a trailing edge 25. It will be recognised that the leading edge 24 faces the flow of exhaust gas during engine operation and conversely the trailing edge 25 faces in a aft or rear direction of the engine.

The channel 21 is located centrally between the leading and trailing edges such that $L_1=L_2$. Thus, the channel 21 is equally spaced between the inner surface of the strut which opposes the leading edge and the inner surface of the strut that opposes the trailing edge. Positioning the channel centrally allows cooling air to be equally directed to both leading and trailing edge surfaces within the hollow strut.

The distribution of holes allows for a uniform cooling of each strut. For particular engine designs there may be areas which are prone higher temperatures than others and so the distribution of holes may be optimised to direct cooling air to zones or regions which experience higher temperatures.

Figure 7:
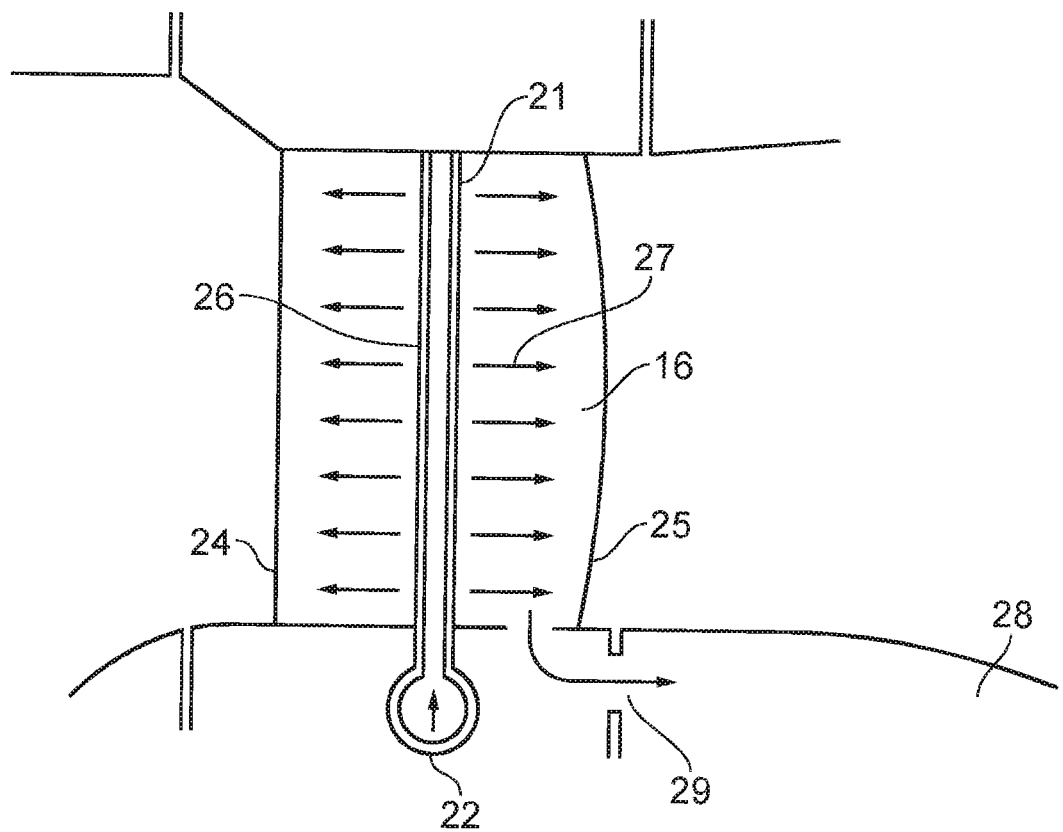
FIG. 7 shows, schematically, how the air flows through the strut.

FIG. 7 shows the channel 21 in the form of a cylindrical tube extending radially outwards from the manifold (not shown). The tube comprises a plurality of holes 26 (see FIG. 6) which are drilled through the wall of the tube 21 facing the leading edge inner surface of the strut. Similarly, the tube comprises a plurality of holes 27 facing the trailing edge inner surface of the strut.

The holes are drilled holes through the wall of the tube and provide a passage through which compressed air within the tube can be ejected or released into the hollow body of the strut.

It will be thus recognised that in operation compressed air is communicated from the compressor, through duct 18, through supply conduct 23 to the manifold 22. The compressed air then passes radially through each of the channels 21 and is ejected or released into the hollow body of each strut. The alignment or distribution of holes directs the high pressure compressed air towards the front and rear (leading and trailing) edges of the strut i.e. the inner surfaces of the strut which oppose the leading and trailing edges.

Thus, cooling of the struts can be achieved internally by providing the flow path from the compressor to the inside of the struts. This in turn controls the temperature of the struts and ensures that the struts do not overheat beyond predetermined temperature thresholds. It follows that materials with lower temperature characteristics (lower melting temperatures) can be used which reduces cost and/or increases the operational temperature range of the engine.

FIG. 7 illustrates the gas flow within a strut 16. Compressed air received from the compressor is communicated to the manifold 22 and flows radially outwards along the channel 21 (also described as a tube or 'spraybar') as illustrated by the arrows. The air then passes out of the channel 21 through the plurality of holes 26, 27 on sides of the channel facing the leading and trailing edges respectively.

The compressed air may for example be taken from the "mid-stage" compressor. A higher stage compressor may be used as the air source if more pressure is required. However, air from the higher stage compressors will have a higher temperature, thus not providing the same cooling effect. If a lower pressure supply is suitable for the given engine air is bled at a lower stage in the compressor to ensure the lowest air temperature for supply to the spraybars.

Typically the pressure at ground idle in the vanes and tailcone is at approximately ambient temperature. Advantageously the pressure inside the spraybar may then be twice that pressure i.e. 2 bars in order to achieve a sonic injection in the spraybar holes, which is preferable for cooling. If bleed is selected from a lower stage compressor and/or if the pipe system pressure drop is large (i.e. thin tubes through vanes to inner manifold) then the pressure in the spraybar could be lower. The temperature may be approximately (T25+T3)/2 with the addition of some heat addition from inside the engine) which causes the air discharging from the holes at as close to sonic speed as possible (i.e. Mach 1.0).

The massflow is proportional to the speed and the area. The impingement (cooling air) is proportional to the speed in square times the massflow, i.e., increasing the speed by 2 gives an increase in cooling of $2^3=8$ times. Advantageously the holes in the spraybar through which air is discharged is as small as possible to maintain the highest possible speed. This is advantageously selected to be at or approximate to Mach 1.0. This assumes that there is sufficient pressure to supply the discharge holes (as discussed above).

The most effective use of the cooling system described herein is under taxi conditions, when highest temperatures occur. During idle the flow in the turbine is not optimal for the aero-design. The holes shall then be positioned to cause air to impinge or strike the vane on the inside in the position where the hot flow gas flow impacts the leading edge. Thus, the hole can be used to cool the vane at positions of greatest heat during taxiing.

The compressed and cold air thus cools the inner surfaces of the hollow strut opposing the leading and trailing edges reducing their temperature. The compressed air in then communicated out of the engine in one example by means of the tail cone 28 through gas exit path 29.

An advantage of the invention is that by means of the cooling arrangement described herein, less expensive materials such as Inconel 718 can be used for TEC design, replacing more expensive materials such as, for example, Hayes 282.

A further advantage of the present design is its simplicity in providing a cooling arrangement for a turbine exhaust casing. Advantageously very little additional components need be added to the engine other than ducting to provide the flow path from the compressor to the struts of TEC. Furthermore, the arrangement can advantageously be retrofitted to existing engine designs.

It will be recognised that because of the conventional hollow natural of the vanes in existing engines the spraybar cooling system described herein may be conveniently retrofitted to an aero-engine by providing a suitable conduit to receiving compressed air and a plurality of holes in the vane together with the air conveying tubes. Advantageously this disclosure thus extends to a method of retro-fitting a cooling arrangement as described herein to a TEC of a gas turbine engine.

It will be recognised that the terms strut and vane may be used interchangeably herein.

The invention claimed is:

1. A turbine exhaust casing (TEC) cooling system for a gas turbine engine, the engine including at least one compressor, comprising:
a turbine exhaust casing including an inner casing portion and an outer casing portion, and a plurality of radially extending hollow struts connecting the inner and outer casing portions;
and an air duct arranged to communicate compressed air from the at least one compressor into at least one of the hollow struts;
wherein compressed air is selectively communicable into at least one of the hollow struts in response to a predetermined temperature threshold of the turbine exhaust casing.

2. The system of claim 1, wherein the air duct is in fluid communication with a manifold, the manifold further comprising a plurality of radially extending channels, each channel extending within and radially along at least part of the radial length of each strut.

3. The system of claim 2, wherein the manifold is a circular manifold concentric with a rotational axis of the at least one compressor and located proximate to the inner casing portion, and wherein the channels extend radially outwards from the manifold.

4. The system of claim 2, wherein the air duct is in fluid communication with the circular manifold through one of the radially extending struts.

5. The system of claim 2, wherein each radially extending channel is a tube extending from the manifold at least part-way along each strut.

6. The system of claim 5, wherein each radially extending channel includes a plurality of holes allowing compressed air inside the channel to pass into the hollow strut in which the channel is located.

7. The system of claim 6, wherein the holes are arranged to eject compressed air from the channel towards the inner surface of the strut corresponding to a leading edge of the strut.

8. The system of claim 7, wherein the holes are arranged to eject compressed air in a speed between Mach 0.8 to 1.0.

9. The system of claim 8, wherein the holes are arranged to eject compressed air towards a leading edge inside position where the hot air is hitting the leading edge on the outside.

10. The system of claim 7, wherein holes are further provided to eject compressed air from the channel towards the inner surface of the strut corresponding to a trailing edge of the strut.

11. The system of claim 6, wherein the holes are arranged in two rows on a leading edge of the strut and a single row on a trailing edge of the strut.

12. The system of claim 5, wherein each tube is positioned centrally within the strut between leading and trailing edges.

13. The system of claim 6, wherein the holes are evenly distributed along the radial length of each tube measured from the manifold.

14. The system of claim 6, where the holes are arranged to direct a greater proportion of air to a leading edge at a suction side of the profile.

15. The system of claim 1, wherein the hollow struts are in fluid communication with an exhaust path of the engine to release air from within each strut to an exhaust path.

16. The system of claim 15, wherein the hollow struts are in fluid communication with a tail cone of the engine.

17. A turbofan gas turbine engine, comprising:
a forward section including a fan arrangement, a midsection containing at least one compressor, and a rear section containing a combustion chamber, at least one exhaust turbine and a turbine exhaust casing,
wherein the turbine exhaust casing further comprises an inner casing portion and an outer casing portion and a plurality of radially extending struts connecting the inner and outer casing portions,
wherein each strut further comprises an internal radially extending channel along at least part of its radial length,
wherein the channel is in fluid communication with one of the compressors and arranged to receive compressed air from the compressor and to release the compressed air into an internal space within the strut,
wherein compressed air is selectively communicable into at least one of the hollow struts in response to a predetermined temperature threshold of the turbine exhaust casing.

\* \* \* \* \*